No. 876,573. PATENTED JAN. 14, 1908.
C. D. MYERS.
KNOT TYING APPARATUS FOR BAGS, &c.
APPLICATION FILED FEB. 13, 1907.

2 SHEETS—SHEET 1.

WITNESSES
F. C. Wilmore
Brennan B. West.

INVENTOR,
Carlos D. Myers
By Bates, Fouts & Hull
ATTORNEYS

No. 876,573. PATENTED JAN. 14, 1908.
C. D. MYERS.
KNOT TYING APPARATUS FOR BAGS, &c.
APPLICATION FILED FEB. 13, 1907.

2 SHEETS—SHEET 2.

WITNESSES:
Brennan B. West.
Nathan F. Freitter.

INVENTOR,
Carlos D. Myers
BY
Bates, Fouts & Hull,
ATTYS.

UNITED STATES PATENT OFFICE.

CARLOS D. MYERS, OF CLEVELAND, OHIO, ASSIGNOR OF ONE THIRTY-SECOND TO F. W. GRIFFIN, ONE SIXTY-FOURTH TO FRANK R. WILLIAMS, AND ONE SIXTY-FOURTH TO GEORGE BATES, OF CLEVELAND, OHIO.

KNOT-TYING APPARATUS FOR BAGS, &c.

No. 876,573.     Specification of Letters Patent.     Patented Jan. 14, 1908.

Application filed February 13, 1907. Serial No. 357,147.

*To all whom it may concern:*

Be it known that I, CARLOS D. MYERS, residing at Cleveland, in the county of Cuyahoga and State of Ohio, have invented a certain new and useful Improvement in Knot-Tying Apparatus for Bags, &c., of which the following is a full, clear, and exact description, reference being had to the accompanying drawings.

My invention relates to an apparatus for tying knots and more especially to an apparatus which is adapted for tying knots around the necks of bags or like objects.

Figure 1:
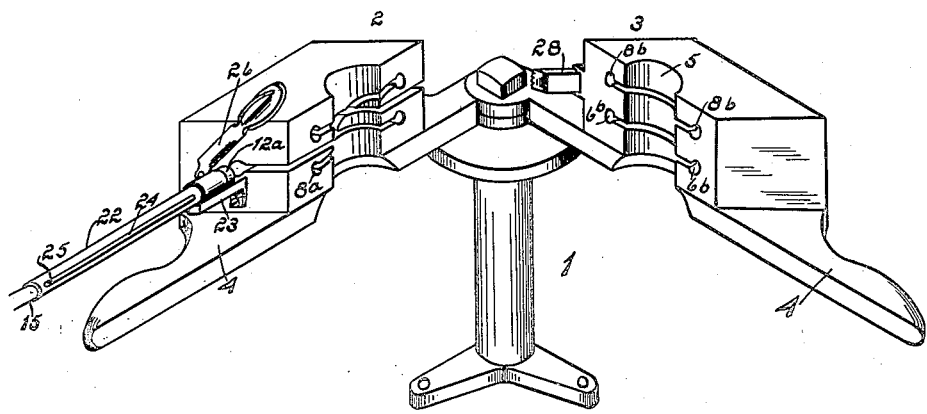
Figure 2:
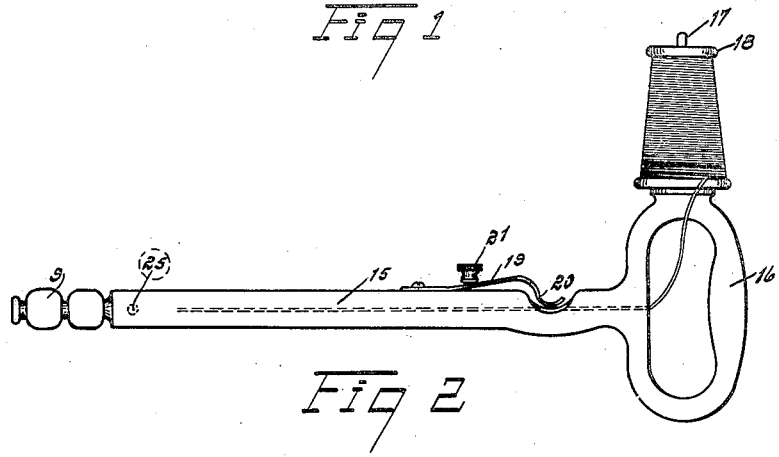
Figure 3:
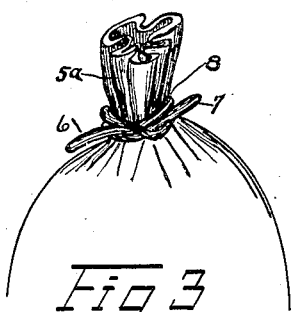
Figure 4:
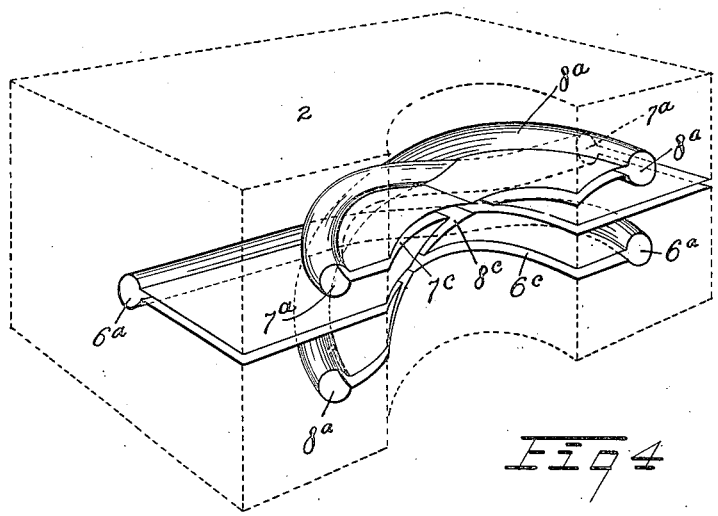
Figure 5:
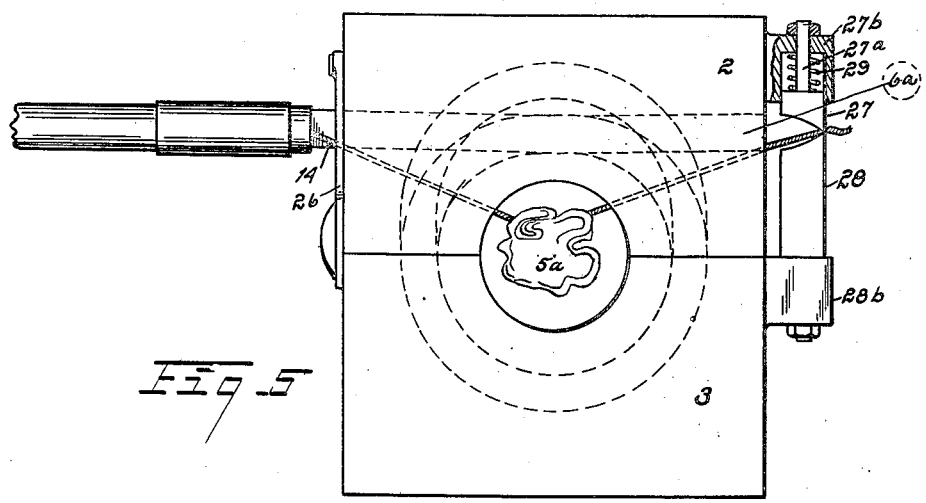
Figure 6:
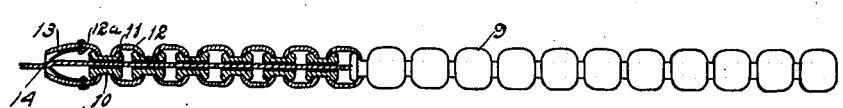

The objects of the invention are to provide an apparatus wherein such knots may be quickly and firmly formed around the mouth of a bag or similar object, and to provide means whereby this result may be embodied in an economical and effective apparatus. I accomplish these results by an embodiment of my invention disclosed in the drawings forming part hereof, wherein Figure 1 represents a perspective view of the die members or blocks wherein the knot is formed and the stand for supporting the same. Fig. 2 represents an elevation of the combined carrier and twine feeding device. Fig. 3 represents a portion of a bag showing the neck thereof secured by means of a knot formed by my apparatus. Fig. 4 represents an enlarged perspective detail of one of the die members in which the knot is formed. Fig. 5 represents a plan view of the complete die, the handles and supports being omitted, the passageway being shown in dotted lines; and Fig. 6 represents a view, partly in elevation and partly in section, of the flexible carrier or device for threading the twine through and depositing the same within the passageways of the die.

Describing the parts by reference characters, 1 represents a stand, to the upper end of which are pivoted two die members 2 and 3,—each member being provided with an operating handle 4. The opposing faces of the die members have each therein a fractional recess 5 for the reception of the neck 5ª of the bag or other object to be tied. Each die member has within the same fractional passageways adapted, when the two die members are brought face to face, to form a complete tortuous passageway for the reception and shaping of the twine to form a knot therein.

The passageways are so arranged that the knot formed shall preferably be a knot known as a clove-hitch,—a knot of this character being shown in Fig. 3. In forming such hitch, it is necessary that the two ends 6 and 7 of the twine shall be engaged and held securely in place by the portion 8 of the twine which crosses the same. To provide for forming a knot of the character shown in Fig. 3, it is necessary to form passageways in the two die members in such manner that, if twine were threaded therethrough, the twine within the die would assume substantially the shape shown in Fig. 3. Furthermore, it is necessary that when the twine is tautened it shall be free to pass through the body of the die into engagement with the neck of the bag which is inserted within the complete recess formed by fractional recesses 5. To accomplish this result, I form in one of the die members or blocks fractional passageways which shall contain the parts 6, 7, and 8. The die member 2 is shown as having therein the fractional passageways which will form such parts 6, 7, and 8 which constitute the hitch proper of the knot. The other die member or block is provided with a pair of parallel fractional passageways wherein the straight portions of the loops or bights of the knot are formed.

In constructing the die, I form a piece of tubing, preferably brass, into the shape of the desired knot (in this case a clove-hitch) and cast the metal of the die around the tubing, whereby the passageway for the knot is provided within the tubing. In casting, the two die sections or members may be formed separately, by suitable spacing means placed in the mold, to avoid the necessity of sawing or otherwise cutting the die in two. By use of a suitable core, the fractional recesses 5 will be cast in the die members. In order to permit the twine to come through the die members into engagement with the neck of the bag or other object which is to be tied, I connect the fractional passageways with the inner faces of the die members to enable the twine to pass therethrough when the same is tautened to form the knot.

As the die member 2 is the one wherein the hitch proper is formed, I will describe the passageways formed therein.

6ª denotes the passageway whereinto the twine is inserted in the die member 2, and 6ᵇ denotes the corresponding passageway in the die member 3.

8ᵃ denotes the passageway in the die member 2 wherein provision is made for the part 8 of the knot to cross over the part 6 and 7, and 8ᵇ represents the corresponding passageway in the die member 3.

7ᵃ denotes the passageway in the die member 2 which corresponds to the portion 7 of the knot. This latter passageway, as will appear particularly from Fig. 4, passes within (or, in the completed knot, under) passageway 8ᵃ, and emerges from the end of the die member 2 which is opposite the inlet end 6ᵃ for the insertion of the twine. At this end, suitable gripping means (to be described hereinafter) is provided for holding the twine to prevent the same from being withdrawn through the passageways of the die when tension is applied to the twine to knot the same around the neck of the bag.

The passageways in the die members communicate with the fractional openings therein by means of fractional channels, said channels being of considerably less width than the diameters of the passageways, the width being sufficient to enable the twine to pass therethrough and said width being less than the diameter of the twine carrier, which will be hereinafter described. These channels are indicated particularly in connection with Fig. 4 at 6ᶜ, 7ᶜ and 8ᶜ as extending respectively between the passageways 6ᵃ, 7ᵃ and 8ᵃ, and the central opening in the die member.

To enable the twine to be threaded quickly and positively through the passageway in the die, I provide a combined feeder and carrier therefor. The carrier proper 9 is composed of a suitable number of joined metallic elements. In Fig. 6, the carrier is shown, said carrier consisting of a suitable number of tubular sections 10 each having a flange 11 at opposite ends thereof, the flanges of adjacent sections being connected by means of a metallic coupling 12, which is generally rounded or spherical in shape and flexibly embraces said flanges. The front end of the carrier 9 consists of an elongated member 12ᵃ having therein a pair of spring clips 13 adapted to engage the forward end of the twine 14 and prevent it from being dropped by the carrier in its travel through the passageway of the die. The angle at which the clamps 13 engage the twine permits them to slide over the twine when the carrier is withdrawn from the passageway of the die, the end of the twine being engaged by the gripping device on the rear end of the die.

To facilitate the application of the carrier proper to the tortuous passageway of the die and to feed the twine to said carrier, I employ a support comprising a stem 15 connected to one end of said carrier, said stem having a central bore or passageway for twine communicating with the bore of the carrier. The other end of the stem is provided with an operating handle 16, and said handle may be provided with a spindle 17 whereon is mounted a spool 18 on which the twine is wound. To deposit the twine within the passageway as the carrier is withdrawn and apply tension thereto sufficient to knot the same around the neck 5ᵃ of a bag or around any other article inserted into the recess 5, I provide a tension device which is illustrated as consisting of a spring 19 attached to the stem 15 and having a downward projection 20 adapted to engage the twine and press the same against the opposite surface of the bore in 15. By means of a screw 21 extending through said spring and threaded into 15, the tension of spring 19 may be adjusted to any desired extent.

To facilitate the application to and employment of the parts 9 and 15 with the die, I provide member 2 with a combined guiding and supporting tube or member 22 which is secured to said member 2, as by means of a bracket 23, with its mouth opposite to and spaced a short distance from fractional passageway 6ᵃ. Tube 22 is sufficiently longer than 9 to accommodate the entire length of the latter therein and to prevent accidental withdrawal of said 9 and 15 from tube 22, the latter is provided with a stop for 15, such stop being shown as a long slot 24 in 22 and a pin 25 projecting from 15 into said slot. Between inner end of 22 and front face of 2 there is provided a knife 26 by means of which the twine may be severed after 9 has been withdrawn from the die.

At the rear side of the die and in operative relation to the rear end of the tortuous passageway therethrough is the gripping device hereinbefore referred to. This device is shown as comprising two oppositely located plungers 27, 28, the inner or front faces whereof are beveled to form a recess of the general shape of but of considerably less width than the width of the end member 12ᵃ of the carrier 9. Plunger 27 is mounted on die-block or member 2 having its stem 27ᵃ in a casing 27ᵇ carried by said block or member, there being a spring 29 in said casing to yieldingly hold the plunger in proper relation to rear end of passageway 6ᵃ. Plunger 28 is similarly mounted on block or member 3 and is provided with a similar casing 28ᵇ having a spring therein (not shown).

With the parts arranged and constructed as shown, the operation will be obvious. The operator opens the die and inserts the neck of the bag or other object to be tied between the central portions of the members and then closes the said members together. Grasping the handle 16, he forces the carrier through the tortuous passageway of the die.

As end member 12ª strikes the beveled or concave faces of plungers 27 and 28, it forces them apart and deposits the end of the twine between the same. On the reverse movement, the end of the twine is firmly gripped between 27 and 28 and will be threaded through the carrier, the angle of springs 13 permitting this action, and deposited within the die. The action of the tension device 20 on the twine will, however, draw the twine through the fractional channels 6ᶜ, 7ᶜ, and 8ᶜ and, by the time the carrier has been withdrawn from the die, a knot will have been formed around the neck 5ª of the bag (as shown in Fig. 5) or around any other article that may have been inserted into recess 5. Knife 26 may then be operated to cut the twine and the die-blocks opened up, releasing the end of the twine from the plungers 27, 28 and permitting the removal of the object around which the knot has been tied.

While the apparatus described herein will ordinarily be employed with twine, I do not propose to be limited in use to its employment with twine, as it will be obvious that it may be used with rope (particularly of small size) flexible wire and the like, the term "twine" being generic and covering such other knot-tying material as it may be desirable to use with my apparatus. Furthermore, while it will have a large field of usefulness in tying the necks of bags, I do not propose to be limited in use to employment with loose articles, as it is obviously adapted for use in connection with other articles.

I claim:

1. In an apparatus for forming knots around the necks of bags and the like, the combination of a die having a central recess for the reception of the neck of a bag and a knot-forming passageway therein surrounding said recess, and means for depositing twine or similar material within said passageway, substantially as specified.

2. In an apparatus for forming knots around the necks of bags and the like, the combination of a die having a central recess for the reception of the neck of a bag and a knot-forming passageway therein surrounding said recess, means for depositing twine or similar material within said passageway, and means for applying the twine thus deposited within the passageway around the neck of the bag, substantially as specified.

3. In an apparatus for tying knots around the necks of bags and the like, the combination of a pair of blocks or die sections each having a fractional recess therein and fractional passageways adapted, when the said blocks or sections are brought together, to form a complete recess and a complete passageway, and means for depositing twine or similar material within said passageway, there being a channel in each block or section establishing communication between the fractional passageway and the fractional recess therein, substantially as specified.

4. In an apparatus for tying knots around the necks of bags and the like, the combination of a pair of blocks or die sections each having a fractional recess therein and fractional passageways adapted, when the said blocks or die sections are brought together to form a complete recess and a complete passageway, means for threading twine or similar material through said passageway, there being a channel establishing communication between said complete passageway and said recess, and means for contracting or closing around the neck of the bag or other object the twine threaded in said passageway during the withdrawal of the twine-threading means therefrom, substantially as specified.

5. In an apparatus for forming knots around the necks of bags and the like, the combination of a die having therein an aperture or recess for the reception of the neck of the bag, said die having also a passageway therein surrounding said aperture, the said passageway being so arranged as to form the desired knot and said die having a relatively narrow channel connecting said passageway with said aperture or recess, and a flexible twine-carrier of greater diameter than said channel and adapted to be inserted into said passageway, substantially as specified.

6. In an apparatus for the purpose described, the combination of a die having therein an aperture for the reception of an article around which a knot is to be formed, said die having a tortuous passageway therein surrounding said aperture and a relatively narrow channel communicating with said passageway and said aperture, and a flexible twine-carrier adapted to be inserted into and threaded through said passageway, said carrier having means for gripping the twine, substantially as specified.

7. In an apparatus for the purpose described, the combination of a die having therein an aperture for the reception of an article around which a knot is to be formed, said die having a tortuous passageway therein surrounding said aperture and a relatively narrow channel communicating with said passageway and said aperture, a flexible twine carrier adapted to be inserted into and threaded through said passageway, said carrier having means for gripping the twine, and means for causing the twine to be deposited within the block or die during the withdrawal of said carrier, substantially as specified.

8. In an apparatus for the purpose specified, the combination of a die having an aperture therein for the reception of an article around which a knot is to be tied and a tortuous passageway therein surrounding said aperture and communicating therewith, and a flexible carrier adapted to be inserted into and threaded through said passageway, said carrier being provided with means for holding the twine while being threaded through said passageway, said means permitting relative movement between the twine and carrier on the reverse movement of the carrier, substantially as specified.

9. In an apparatus for the purpose specified, the combination of a die having an aperture therein for the reception of an article around which a knot is to be tied, a tortuous passageway in said die surrounding said aperture and communicating therewith, a flexible carrier adapted to be inserted into and threaded through said passageway, said carrier being provided with means for holding the twine while being threaded through said passageway, said means permitting relative movement between the twine and carrier on the reverse movement of the carrier, and means for gripping or retaining the twine during such reverse movement of the carrier, substantially as specified.

10. In an apparatus for the purpose specified, the combination of a die having an aperture therein for the reception of an article to be tied, and means for knotting twine around said article, said means comprising a flexible carrier having a bore therethrough for the reception of twine, a support for said carrier, the said die having a tortuous passageway therein of such shape as to give to the carrier a shape corresponding to the knot to be formed, and means for engaging the end of the twine and permitting the flexible carrier to be withdrawn from the passageway and to slide over the twine during such withdrawal, substantially as specified.

11. As a means for threading twine into a tortuous passageway to form a knot from said twine, a carrier composed of a plurality of hollow sections flexibly connected and having means for gripping and disengaging the twine, substantially as specified.

12. As a means for threading twine into a tortuous passageway to form a knot from said twine, a carrier composed of a plurality of short tubular sections, each having flanges at opposite ends thereof and hollow connecting members flexibly engaging the adjacent flanges of adjacent sections, substantially as specified.

13. As a means for threading twine through a tortuous passageway to form a knot in the twine, the combination of a flexible carrier having a central bore therethrough, and a hollow support for said carrier having a bore communicating with the carrier bore, substantially as specified.

14. As a means for threading twine through a tortuous passageway to form a knot in the twine, the combination of a flexible carrier having a central bore therethrough, a hollow support for said carrier having a bore communicating with the carrier bore, means for supporting a ball or spool of twine on said support, and a tension device carried by said support, substantially as specified.

15. A die for forming knots in twine or similar material having therein a central aperture for the reception of the neck of a bag or like material, a tortuous passageway surrounding said aperture, said passageway being of such shape as to correspond with the desired knot, and a tortuous channel extending from said passageway inwardly into the aperture, substantially as specified.

16. A die for the purpose described, said die comprising a pair of separate die blocks or sections, each having a fractional aperture therein adapted when the die blocks or sections are brought face to face to form a complete aperture and fractional passageways therein adapted, when the said blocks or sections are brought face to face, to form a continuous tortuous passageway of a shape to form the desired knot, there being fractional channels in each of said blocks or sections extending between the fractional passageways and the fractional aperture therein, substantially as specified.

17. In an apparatus of the character herein set forth, the combination of an element having therein a passageway arranged to form a knot in twine or similar material, and means for depositing the twine or similar material within said passageway, substantially as specified.

18. In an apparatus of the character herein set forth, the combination of a die having therein means for forming twine or similar material into a knot, and means connected therewith for supplying twine or similar material thereto, substantially as specified.

19. In an apparatus of the character herein set forth, the combination of an element having therein a passageway arranged to form a knot in twine or similar material, means for depositing twine or similar material within said passageway, and means for retaining the twine or similar material within said element during the withdrawal of the depositing means, substantially as specified.

20. In an apparatus of the character herein set forth, the combination of an element having therein a passageway arranged to form a knot in twine or similar material, means for depositing twine in said passageway, and means for automatically tautening the twine during the removal of the depositing means from said element, substantially as specified.

21. In an apparatus of the character herein set forth, the combination of an element having therein an aperture for the reception of the article to be tied and a tortuous passageway surrounding said aperture and arranged to form a knot in twine or similar material and a channel establishing communication between said passageway and the aperture, means for depositing twine in said passageway, and means operative upon the withdrawal of the twine - depositing means for automatically drawing the twine through said channel into the aperture, substantially as specified.

22. In an apparatus of the character herein set forth, the combination of a die having an aperture therein for the reception of the article to be tied, said die having therein a tortuous passageway surrounding said aperture and so arranged as to form a knot in twine or similar material, a gripping device for twine operatively associated with said die, a flexible carrier for the twine and adapted to bring a portion of the twine carried thereby in operative relation to said gripping device, and a tension device adapted to automatically tauten the twine during the withdrawal of the carrier from the passageway, substantially as specified.

23. In an apparatus of the character herein set forth, the combination of a die having an aperture therein for the reception of the article to be tied, said die having therein a tortuous passageway surrounding said aperture and so arranged as to form a knot in twine or similar material and a channel communicating with said aperture and passageway, a gripping device for twine operatively associated with said die, a flexible carrier for the twine and adapted to bring a portion of the twine carried thereby in operative relation to said gripping device, and a tension device adapted to automatically tauten the twine during the withdrawal of the carrier from the passageway.

24. In an apparatus of the character herein set forth, the combination of a die having an aperture for the reception of the article to be tied, a tortuous passageway extending through said die and surrounding said aperture and a channel in said die establishing communication between said passageway and said aperture, a gripping device carried by said die adjacent to the outlet end of the passageway, and means for threading twine through said passageway and bringing a portion thereof in operative relation to said gripping device, substantially as specified.

25. In an apparatus of the character herein set forth, the combination of a die having an aperture for the reception of the article to be tied, a tortuous passageway extending through said die and surrounding said aperture and a channel in said die establishing communication between said passageway and said aperture, a gripping device carried by said die adjacent to the outlet end of the passageway, a flexible carrier for threading twine through said passageway and bringing a portion thereof in operative relation to said gripping device, and a tension device associated with said carrier, substantially as specified.

26. In an apparatus of the character herein set forth, the combination of a die having an aperture therein for the reception of the article to be tied and a tortuous passageway extending therethrough and surrounding said aperture and a channel extending between said passageway and said aperture, a tubular support carried by said die adjacent to the inlet end of the passageway, a gripping device carried by said die adjacent to the outlet end of said passageway, a flexible carrier operatively mounted in said support and adapted to be threaded through said passageway and bring a portion of the twine into operative relation to the gripping device, a tension device associated with said carrier, and a knife pivoted to said die between said support and the inlet end of the passageway, substantially as specified.

27. In an apparatus of the character herein set forth, the combination of a die having an aperture therein for the reception of the article to be tied and a tortuous passageway extending therethrough and surrounding said aperture and a channel extending between said passageway and said aperture, a support carried by said die adjacent to the inlet end of the passageway, a gripping device carried by said die adjacent to the outlet end of said passageway, a flexible carrier operatively mounted in said support and adapted to be threaded through said passageway and bring a portion of the twine into operative relation to the gripping device, a tension device associated with said carrier, and a stop for preventing the withdrawal of the carrier from the support, substantially as specified.

28. In an apparatus of the character herein set forth, the combination of a pair of die blocks or members pivotally connected at a point beyond their rear faces, each of said blocks or members having therein a fractional recess and fractional passageways adapted, when the blocks or members are brought face to face, to form a complete aperture and a complete passageway and each block having fractional channels connecting the fractional passageways therein with the fractional recesses, one of said blocks or members having therein the inlet and the outlet for the complete passageway, a gripping device mounted adjacent to said outlet, said device comprising a pair of grippers, one mounted on each block or member and adapted, when the blocks or members are brought together, to grip twine supplied through the passageway, a flexible carrier mounted adjacent to the inlet of the passageway, and a tension device asssociated with said carrier, substantially as specified.

29. In an apparatus of the character herein set forth, the combination of a pair of die blocks or members pivotally connected at a point beyond their rear faces, each of said blocks or members having therein a fractional recess and fractional passageways adapted, when the blocks or members are brought face to face to form a complete aperture and a complete passageway, said passageway having an outlet in the rear face of one of said blocks or members, each block having fractional channels therein connecting the fractional passageways therein with the fractional recesses, a gripping device mounted adjacent to the outlet of said passageway, said device comprising a pair of grippers, one mounted on each block or member, and adapted when the blocks or members are brought together to grip twine supplied through the passageway, means for threading twine through said passageway and bringing a portion thereof into operative relation to said device, and means for tautening the twine after its engagement by said device, substantially as specified.

In testimony whereof, I hereunto affix my signature in the presence of two witnesses.

CARLOS D. MYERS.

Witnesses:
J. B. HULL,
S. E. FOUTS.